United States Patent [19]
Mizuta et al.

[11] 4,316,262
[45] Feb. 16, 1982

[54] REMOTE METER READING SYSTEM

[75] Inventors: Toshiaki Mizuta, Kawasaki; Takeshi Abe, Yokohama; Ichiro Yoshihara, Funabashi; Kazuhito Saito, Kawasaki; Keishin Tsuchiya, Higashi-Yamato, all of Japan

[73] Assignee: Ricoh Co., Ltd., Tokyo, Japan

[21] Appl. No.: 43,639

[22] Filed: May 30, 1979

[30] Foreign Application Priority Data

Jun. 8, 1978 [JP] Japan ................. 53-69177

[51] Int. Cl.³ .................... G06F 3/04; H03B 3/00
[52] U.S. Cl. .................... 364/900; 340/310 A
[58] Field of Search ... 364/200 MS File, 900 MS File, 364/483; 340/147 R, 150, 151, 168 B, 310 A; 235/92 MT

[56] References Cited

U.S. PATENT DOCUMENTS

| | | | |
|---|---|---|---|
| 3,344,408 | 9/1967 | Singer et al. | 364/900 |
| 3,531,771 | 9/1970 | Jaxheimer et al. | 235/92 MT |
| 4,114,141 | 9/1978 | Travis | 340/151 |
| 4,135,181 | 1/1979 | Bogacki et al. | 340/151 X |
| 4,159,530 | 6/1979 | Raimond et al. | 364/900 |
| 4,162,484 | 7/1979 | Abe et al. | 340/150 |
| 4,228,422 | 10/1980 | Perry | 340/310 A |

Primary Examiner—Harvey E. Springborn
Attorney, Agent, or Firm—Burgess, Ryan and Wayne

[57] ABSTRACT

A remote meter reading system in which clock pulses are transmitted to a selected remote terminal to charge a capacitor there which acts as the terminal power supply. Subsequent clock pulses reset a ten-stage bit counter and four-stage digit counter, after which additional clock pulses step the bit counter, the outputs of which are AND-gated with the outputs of the digit counter, in such a manner that the current drawn from the central data collection terminal is increased whenever there is coincidence between the bit counter and digit counter outputs. A counter at the central data terminal is stepped by the clock pulses and disabled by the relatively large pulses developed when the bit and digit counter outputs coincide. Therefore, the output of the central data terminal counter corresponds to the desired meter reading.

5 Claims, 14 Drawing Figures

REMOTE METER READING SYSTEM

BACKGROUND OF THE INVENTION

The present invention relates to a data collection system for reading the indications of watt-hour meters, watermeters or gas meters distributed over remote locations.

There have been proposed various systems for collecting the indications of watt-hour meters, gas meters or water meters installed in respective homes and buildings. However the remote terminal equipment of the prior art data collection systems is in general provided with a power source and a clock pulse generator so that the indication of a meter may be read in response to the clock pulses. As a result the remote terminal equipment is rather expensive. Furthermore when the power source consists of batteries, misreading results due to the voltage drop and the batteries must be replaced periodically. Thus from the standpoint of system accuracy and maintenance, the prior art data collection systems are not satisfactory in practice. In order to overcome these problems there has been proposed a data collection system where the power is supplied from the centralized data terminal to each remote terminal equipment. However this system needs additional power transmission lines in addition to the data transmission lines so that the installation costs will increase and the system itself becomes complex. There has been proposed another data collection system wherein the clock pulses are transmitted from the centralized data terminal to each remote terminal equipment so as to eliminate the provision of a clock generator in each remote terminal equipment. However the amplitude of the clock pulses varies due to the influences of electrical resistance of the transmission line interconnecting between the centralized data terminal and each remote terminal equipment so that misreadings tend to occur often. There has been further proposed a data collection system wherein the centralized data terminal transmits the clock pulses to each remote terminal equipment so that not only the reading may be obtained in response to the clock pulses but also some clock pulses may be used to provide a power source. However since the clock pulses are used not only as the power signal but also as the data signal, they tend to become unstable, resulting in the misreading.

SUMMARY OF THE INVENTION

Accordingly, one of the objects of the present invention is to provide a data collection system wherein a centralized data terminal is connected to each remote terminal equipment with a minimum number of transmission lines so as to transmit the clock pulses to each remote terminal equipment, the clock pulses being used not only as the signal for reading the indication of a meter but also for providing the power source.

Another object of the present invention is to provide a data collection system wherein in the case of reading, only the current or clock pulses required for reading may flow so that misreading may be essentially eliminated.

A further object of the present invention is to provide a data collection system wherein in the case of reading out the data, adverse effects depending upon the electrical resistance of the transmission line may be minimized.

A still another object of the present invention is to provide a data collection system which is simple in construction, inexpensive in fabrication and installation and highly reliable and dependable in operation.

DESCRIPTION OF THE PREFERRED EMBODIMENTS

Figure 1:
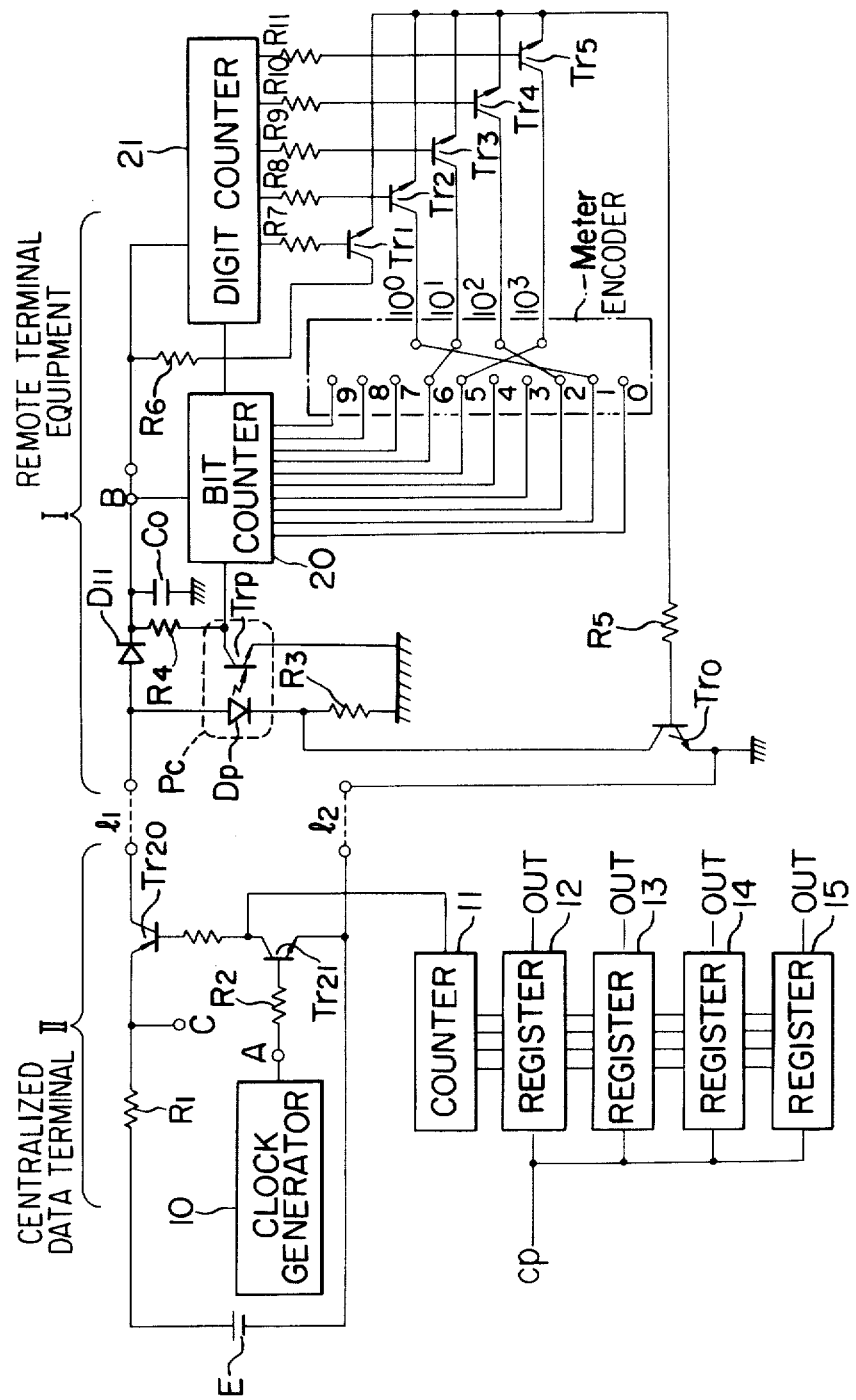
FIG. 1 is a block diagram of a first embodiment of a data collection system in accordance with the present invention.
Figure 2:
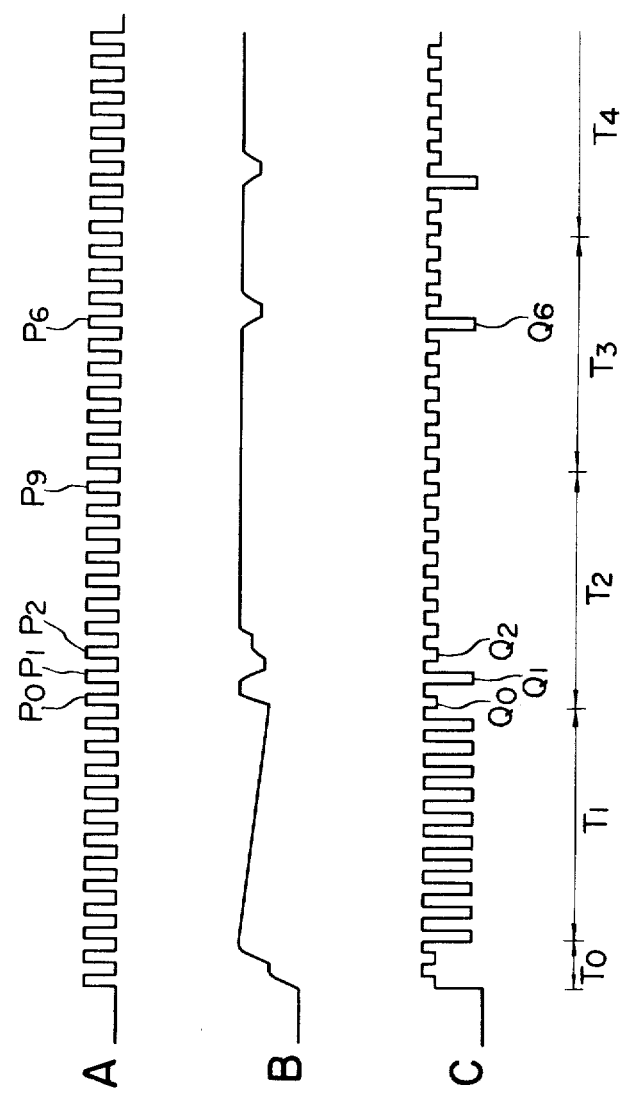
FIG. 2, including A–C shows the waveforms of signals used for the explanation of the mode of operation thereof.

First Embodiment, FIGS. 1 and 2

Referring to FIGS. 1 and 2, reference numeral I denotes a remote terminal equipment which reads measured data; that is, an indication of a watt-hour meter, a water meter or a gas meter and transmits the data to a centralized data terminal II through transmission lines $l_1$ and $l_2$. In response to the clock pulses (See FIG. 2,A) generated by a clock pulse generator 10 in the centralized data terminal II, a transistor $Tr_{21}$ is turned on and off and the output from the transistor $Tr_{21}$ is transmitted not only to the base of a transistor $Tr_{20}$ but also to a counter 11. When the centralized data terminal II selects the remote terminal equipment I, the transistors $Tr_{21}$ and $Tr_{20}$ are operated in the manner described above in response to the clock pulses from the clock generator 10, and the clock pulses which are synchronized with the clock pulses from the clock generator 10 are also transmitted through the transmission lines $l_1$ and $l_2$ to the remote terminal equipment I which is now selected. A first few clock pulses transmitted to the remote terminal equipment I pass through a reverse-current-blocking diode $D_{11}$ and charge a capacitor $C_0$ (See FIG. 2,B) so as to provide a voltage source for the remote terminal equipment I. When the voltage across the capacitor $C_0$ reaches a predetermined level, a bit counter 20 and a digit counter 21 are set. The initial values set in the counters 20 and 21 are not predetermined. That is, the set conditions of these counters 20 and 21 are not clear. However, in response to the clock pulses transmitted from the centralized data terminal I, both the counters 20 and 21 are set to first outputs and a transistor $Tr_1$ is enabled while a transistor $Tr_0$ is ready to operate. Therefore the succeeding clock pulses pass through a photodiode $D_P$ and the transistor $Tr_0$ into the bit counter 20 so that the contents in the counter 20 are incremented or stepped up. When the bit counter 20 has counted 10 clock pulses, the digit counter 21 is incremented by one (See FIG. 2,C, time interval $T_1$) so that the digit counter 21 selects a transistor $TR_2$ corresponding to the $10^0$ digit position. However at this instant no voltage is delivered to the collector of the transistor $Tr_2$ so that the transistor $Tr_0$ remains disabled.

In response to the clock pulses $P_0$ transmitted from the centralized data terminal after the $10^0$ digit position of the digit counter 21 has been selected, a photocoupler Pc is enabled so that the bit counter 20 is incremented by one. At this instant the transistor $Tr_0$ remains disabled as described above and the clock pulse $P_0$ flows through a resistor $R_3$ having a relatively high value so that the voltage drop across a resistor $R_1$ is small and consequently a potential at a point C is low as shown at $Q_1$ in FIG. 2,C.

When the third clock pulse $P_2$ is delivered, the transistor $Tr_2$ is not supplied with the collector voltage because the bit counter 20 has been advanced to the third bit position. As a result the transistor $Tr_0$ remains disabled so that the potential at the point C will not drop below the potential when the bit counter 20 is delivering the second bit output.

In like manner in response to the clock pulses $P_3$–$P_9$ transmitted from the centralized data terminal I, the bit counter 20 is incremented, but the transistor $Tr_0$ remains disabled so that during the time interval $T_2$ allocated for reading the digit at the $10^0$ digit position the potential at the point C may drop only once when a meter M closes one of the contacts at the $10^0$ digit position. Therefore a digit at the $10^0$ digit position may be read at the instant when the potential at the point C drops. In like manner, a digit at the $10^1$ digit position may be read during the time interval $T_3$; a digit at the $10^2$ digit position, during the time interval $T_4$; and a digit at the $10^3$ digit position, during the time interval $T_5$ (not shown). Thus the indication "5261" of the meter M may be read and transmitted to the centralized data terminal II.

The indication by the meter M is displayed by the counter 11 and registers 12–15 in the centralized data terminal II. That is, the contents of the counter 11 are returned to zero every time when it counts 10 clock pulses transmitted from the clock pulse generator 10, more particularly, it starts counting from the first one of the sync pulses transmitted during the time interval $T_1$ and in response to the first pulse $P_0$ transmitted during the time interval $T_2$ allocated for reading a bit at the $10^0$ digit position, the contents in the counter 11 return to zero. Therefore depending upon the number of pulses $P_0$–$P_9$ delivered to the counter 11 during the time interval $T_2$, the contents in the counter 11 ascend from 0 to 9, but in response to the voltage drop at the point C the contents in the counter 11 are transferred into the register 12.

As described above, when the counter 11 has counted ten clock pulses, it returns to zero and counts the clock pulses again. Therefore in response to the pulse $P_{16}$ which appears at the point C when the counter 11 is counting the digits at the $10^1$ digit position, the contents in the register 12 are transferred into the register 13 while the contents in the counter 11 are transferred into the register 12. In like manner, in response to the pulse which appears at the point C when the counter 11 is counting the digits at the $10^2$ digit position or during the time interval $T_4$, the contents in the register 13 are transferred into the register 14; the contents in the register 12 are transferred into the register 13; and the contents in the counter 11 is transferred into the register 12. In response to the pulse which appears at the point C during the time interval $T_5$ for reading the digit at the $10^3$ position, the contents in the register 14 are transferred into the register 15; the contents in the register 13, into the register 14; the contents in the register 12, into the register 13; and the contents in the counter 11, into the register 12. Thus the reading or indication of the meter M is stored in the registers 12–15 in the centralized data terminal II.

In summary, according to the first embodiment of the present invention a line for transmitting the power to each remote terminal equipment I may be eliminated. That is, the data may be transferred from each remote terminal equipment through only two transmission lines $l_1$ and $l_2$ to the centralized data terminal II so that the installation costs may be considerably reduced and the data collection system may be simplified.

Figure 3:
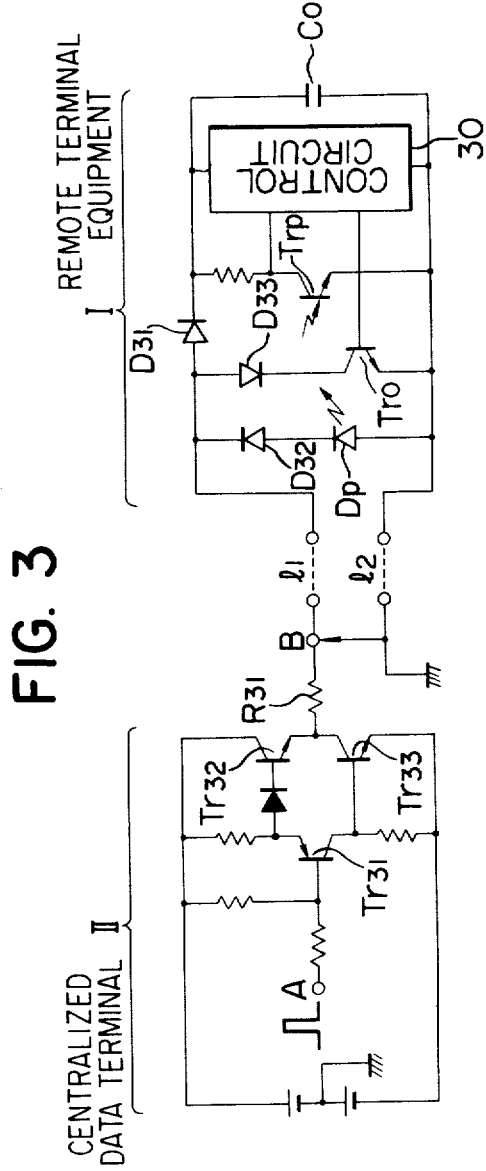
FIG. 3 is a block diagram of a second embodiment of the present invention.
Figure 4:
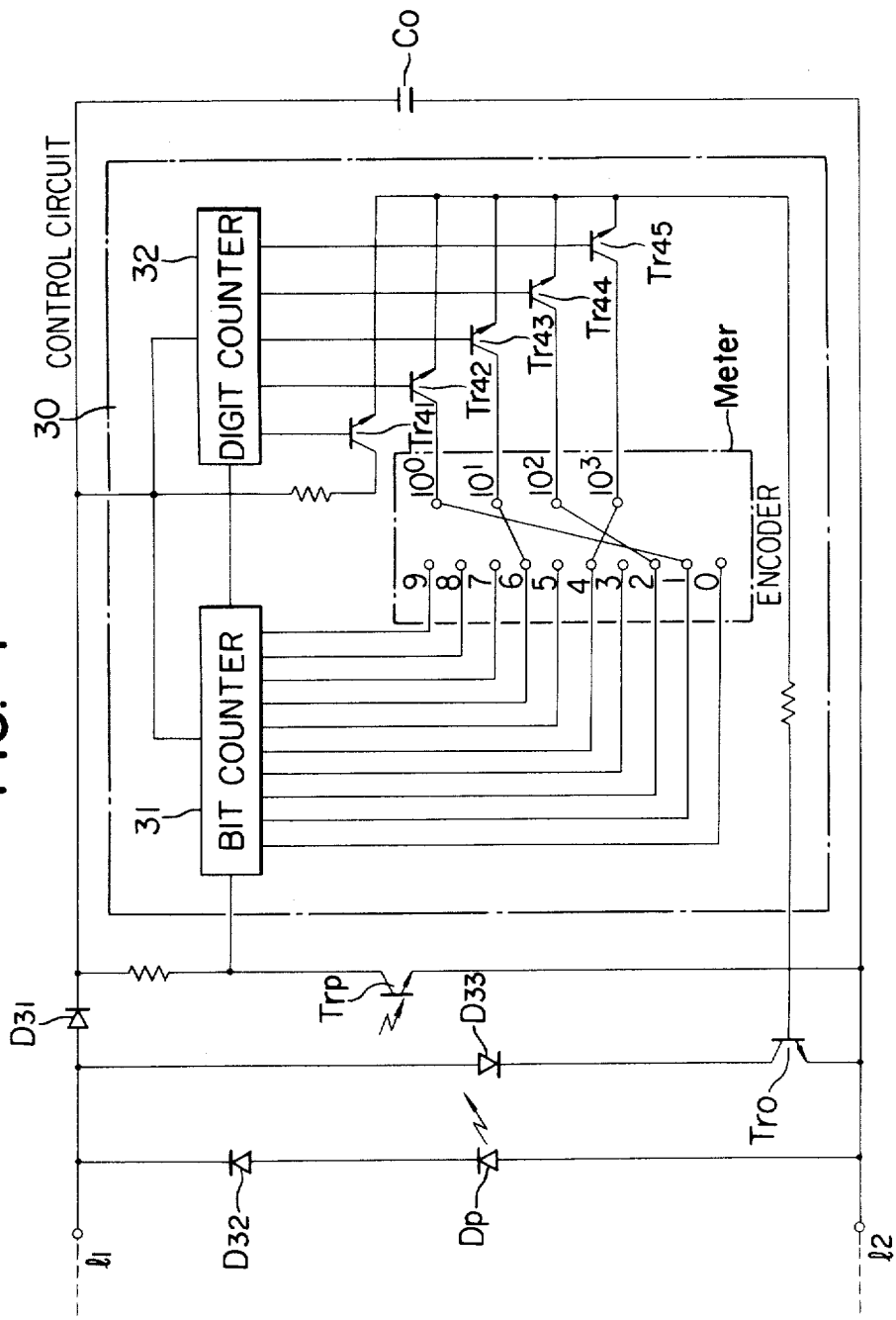
FIG. 4 is a detailed circuit diagram of a control circuit of the second embodiment.
Figure 5:
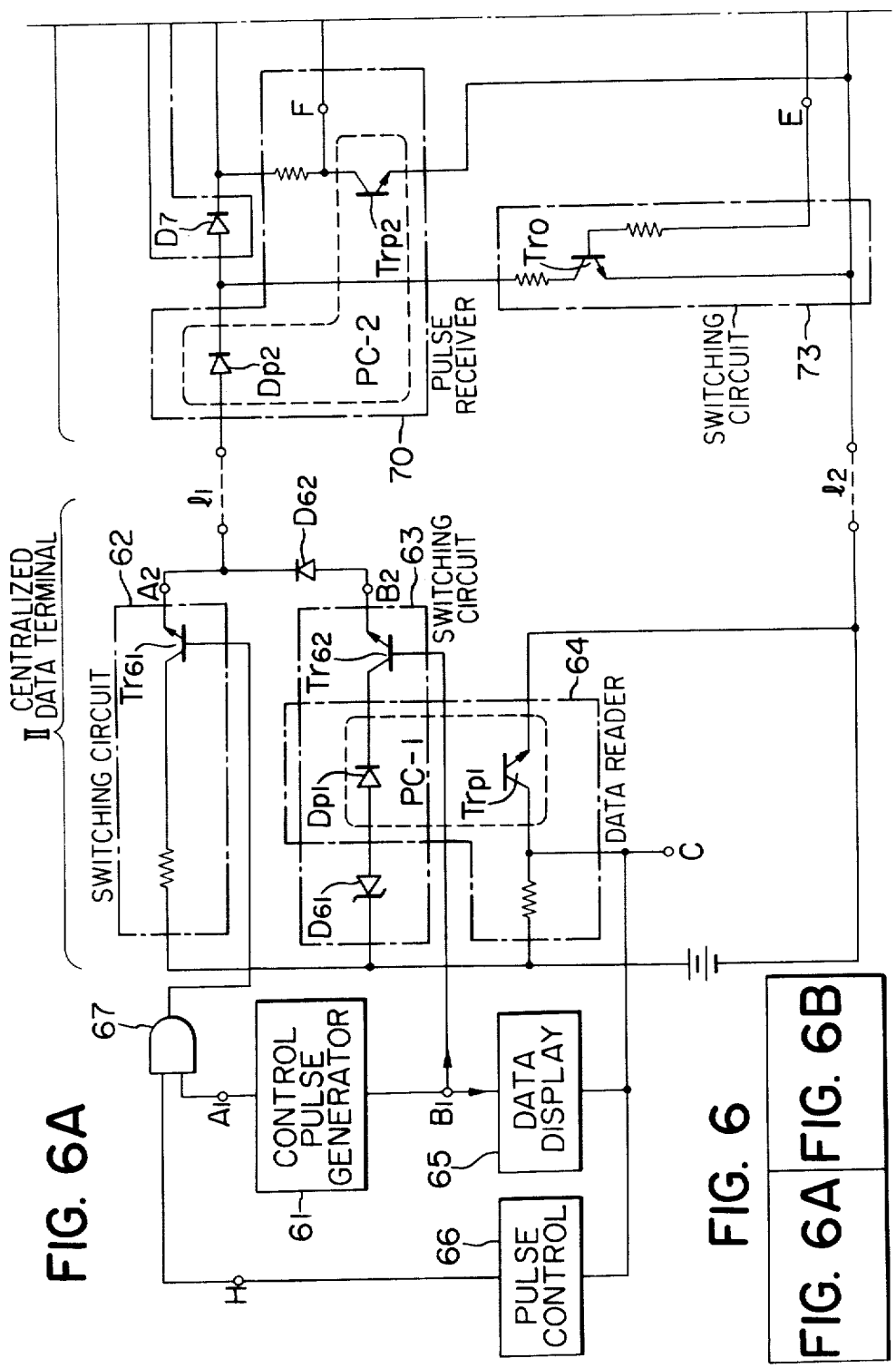
FIG. 5 shows pulse signal waveforms used for the explanation of the mode of operation of the second embodiment.
Figure 6:
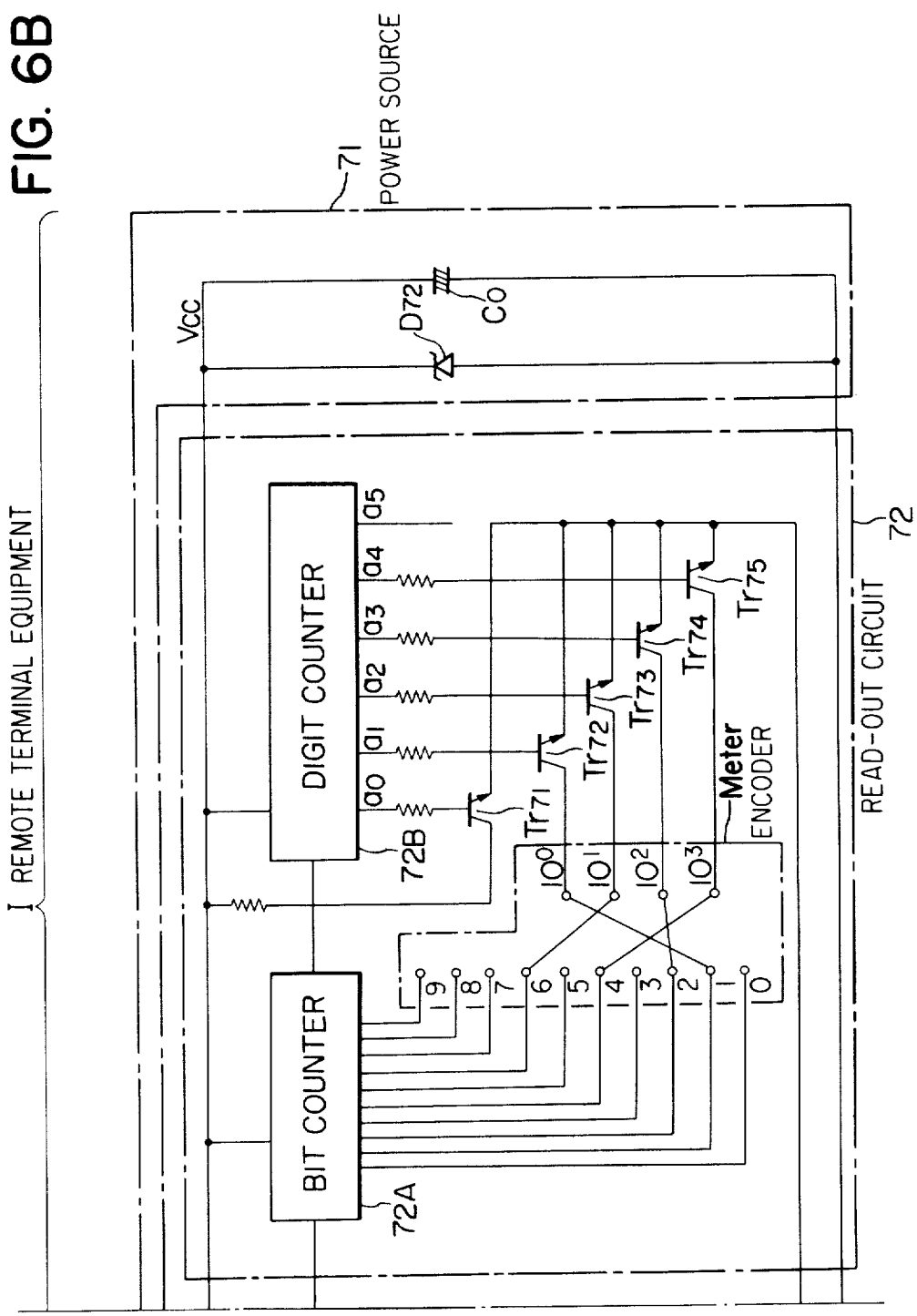
FIGS. 6A and 6B (combined according to FIG. 6) constitute a block diagram of a third embodiment of the present invention.

Second Embodiment, FIGS. 3–5

Referring to FIGS. 3–5, as with the first embodiment described above, the centralized data terminal II is connected through the two transmission lines $l_1$ and $l_2$ to the remote terminal equipment I. The remote terminal equipment I includes a control circuit generally indicated by The reference numeral 30. In response to the clock pulses transmitted from the centralized data terminal II, the control circuit 30 reads the data or indication of the meter M and controls the switching transistor $Tr_0$ so as to transfer the read data to the centralized data terminal II.

In the centralized data terminal II, a clock pulse generator (not shown) generates the clock pulses which are applied to a terminal A. When the potential at the input terminal A rises, a transistor $Tr_{31}$ is disabled while a transistor $Tr_{32}$ is enabled and a transistor $Tr_{33}$ is disabled. As a result, the first transmission line $l_1$ rises to a positive voltage. On the other hand when the potential at the input terminal A drops to a low level, the transistor $Tr_{31}$ is enabled; the transistor $Tr_{32}$ is disabled; and the transistor $Tr_{33}$ is enabled. As a result the transmission line $l_1$ drops to a negative voltage. Thus in response to the clock pulses applied to the input terminal A, the transmission line $l_1$ alternately rises to a positive voltage and drops to a negative voltage. That is, the positive- and negative-polarity clock pulses are alternately transmitted to the remote terminal equipment I. First a few positive polarity pulses pass through a reverse current blocking diode $D_{31}$ and charge the capacitor $C_0$ so as to provide a voltage source for the remote terminal equipment I. When the voltage across the capacitor $C_0$ reaches a predetermined level, the control circuit 30 is enabled to read the data and control the switching transistor $Tr_0$ so as to transfer the data to the centralized data terminal II.

The control circuit 30 is shown in detail in FIG. 4. The positive- and negative-polarity clock pulses are transmitted through the transmission line $l_1$ as described above. In response to the negative polarity clock pulse, the current flows through the photodiode $D_P$ and a diode $D_{32}$ so that a phototransistor $Tr_p$ is enabled. On the other hand, in response to the positive polarity clock pulse, the capacitor $C_0$ is charged. Alternatively when the control circuit 30 is enabling the switching transistor $Tr_0$ as will be described below, the positive polarity clock pulse flows through a diode $D_{33}$ and the switching transistor $Tr_0$ so that the voltage drop across a resistor $R_{31}$ is small and consequently the potential at a point B rises to a high level. Therefore the data in the remote terminal equipment I may be read when the potential at the point B is monitored at the centralized data terminal as will be described in more detail below.

Referring particularly to FIG. 4, the control circuit 30 has a bit counter 31, a digit counter 32 and the meter M. In response to the positive and negative polarity clock pulses received after the voltage across the capacitor $C_0$ has reached a predetermined level, both the bit and digit counters 31 and 32 are reset and the transistor $Tr_{41}$ is enabled. The switching transistor $Tr_0$ is also enabled. In response to the negative polarity clock pulse the phototransistor $Tr_p$ is enabled so that the contents in the bit counter 31 are incremented by one, but since the switching transistor $Tr_0$ is enabled, when the positive polarity clock pulse is being transmitted through the transmission line $l_1$, the potential at the point B is at a low level as shown at $T_0$ in FIG. 5. When the bit counter 31 is incremented by 10, the digit counter 32 is incremented by one so that the transistor $Tr_{41}$ is disabled while the transistor $Tr_{42}$ is ready to be enabled. In FIG. 5 the positive polarity clock pulses are indicated by $P_{00}$, $P_{01}$, . . . ; the negative polarity pulses, by $Q_{00}$, $Q_{01}$, . . . ; and the ground level, by GL.

It is assumed that the reading of the meter M be "4261". Then even though the digit counter 32 has selected the transistor $Tr_{42}$ as described above, no collector voltage is supplied thereto so that it cannot be enabled. As a result the switching transistor $Tr_0$ remains disabled. Even when the bit counter 31 receives the clock pulse $Q_{10}$, the clock pulse $P_{10}$ will not flow because the switching transistor $Tr_0$ remains disabled as described above. Consequently, the potential at the point B remains at a relatively high level (See $P_{10}$ in FIG. 5). When the bit counter 31 whose contents have been one receives another clock pulse $Q_{11}$, the collector voltage is supplied to the transistor $Tr_{42}$ so that the latter is enabled and consequently the switching transistor $Tr_0$ is also enabled. As a result the voltage drop across the resistor $R_{31}$ increases and consequently the potential at the point B drops to a low level as indicated at $P_{11}$ in FIG. 5.

When the bit counter 31 receives the clock pulse $Q_{12}$, its contents are already 3 so that voltage is supplied to the collector of the transistor $Tr_{42}$ and consequently the switching transistor $Tr_0$ is disabled. As a result, the potential at the point B rises back to a high level. The bit counter 31 receives the clock pulses $Q_{13}$–$Q_{19}$ sequentially so that the contents ascend, but voltage is supplied to the collector of the transistor $Tr_{42}$ so that the latter remains disabled. That is, during the time interval $T_1$ allocated for the reading of a digit at the $10^0$ digit position the potential at the point B drops to a low level only one time depending upon the interconnection between one of the digit terminals from 0 to 9 (2 in the second embodiment) and the $10^0$ digit position terminal in the meter M.

In like manner, the digit 6 at the $10^1$ digit position is read during the time interval $T_2$; the digit 2 is read during the time interval $T_3$; and the digit 4 is read during the time interval $T_4$. Thus the data "4261" may be read.

It is however not certain when the control circuit 30 starts among its sequential operations, but ten consecutive low-level pulses can be derived at the point B as shown at $T_0$ in FIG. 5. Therefore the reading may be started after counting at least ten consecutive low-level pulses as sync pulses. Then the correct reading may be obtained every time.

In summary, in the second embodiment of the present invention, the positive- and negative-polarity clock pulses are used so that no extra current will flow in the case of the reading. In addition, the amplitude of the clock pulses may be increased so that data reliability may be remarkably improved when the centralized data terminal II collects the data from its remote terminal equipment I.

Third Embodiment, FIGS. 6, 6A, 6B and 7

Referring to FIGS. 6, 6A, 6B and 7, as with the first and second embodiments described above, the remote terminal equipment I is connected to the centralized data terminal II through two transmission lines $l_1$ and $l_2$.

The centralized data terminal II has a control pulse generator 61, switching circuits 62 and 63, a data reader 64, a data display 65, a pulse control circuit 66 and an AND gate 67. The terminal equipment I has a pulse receiver 70, a power source 71, an encoder M, a readout circuit 72 and a switching circuit 73.

Figure 7:
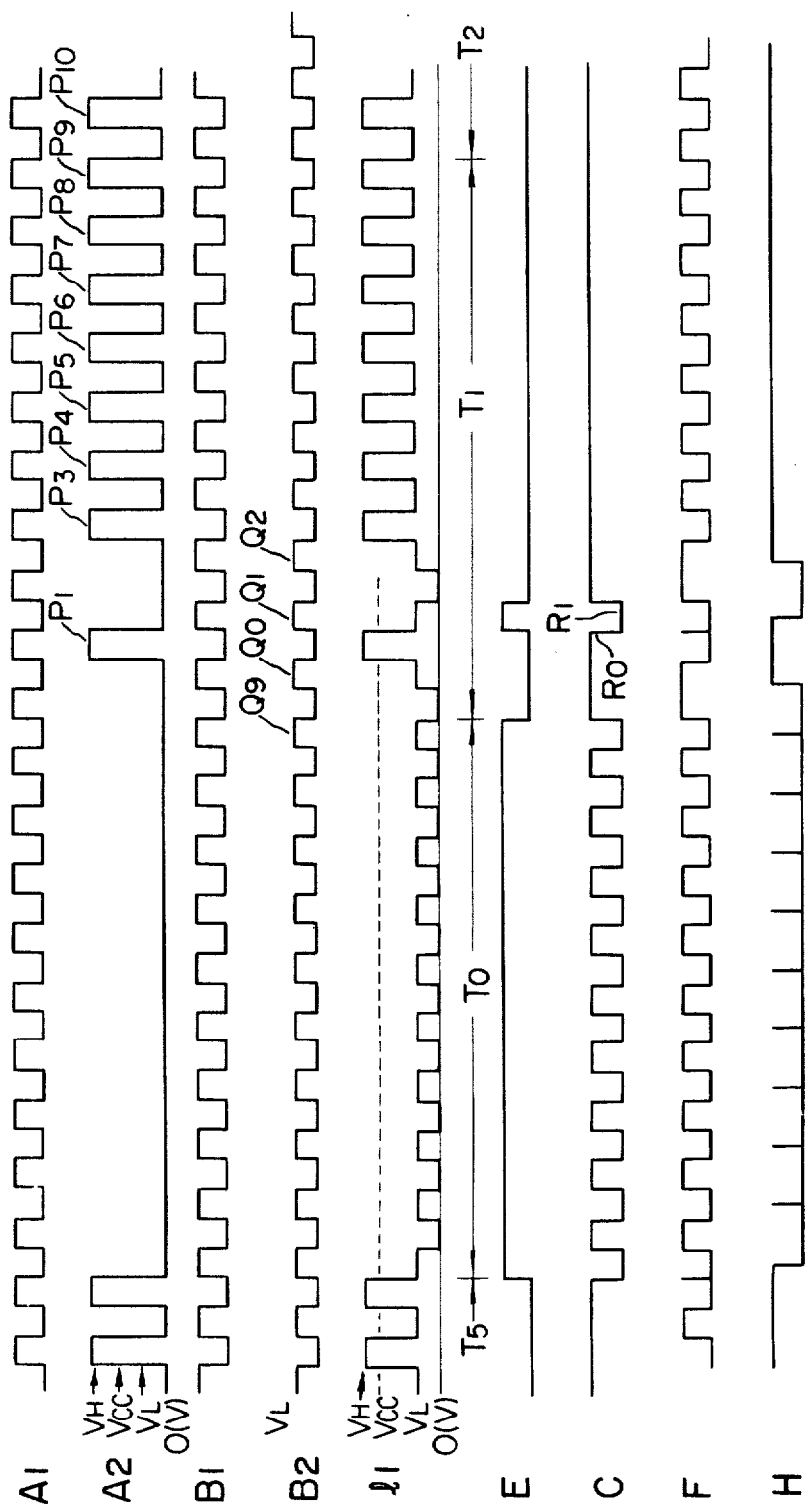
FIG. 7 shows various signal waveforms used for the explanation of the mode of operation of the third embodiment.

The control pulse generator 61 generates control pulse trains as shown at $A_1$ and $B_1$ in FIG. 7. The control pulses $A_1$ are applied to AND gate 67 while the control pulses $B_1$ are applied to the switching circuit 63 and the data display 65. In response to the data signal shown at C in FIG. 7, the pulse control circuit 66 delivers the "L" output for one pulse duration to the AND gate 67 so that the gate 67 is closed and consequently the clock pulse $A_1$ from the control pulse generator 61 may be inhibited.

When the control pulses $A_1$ pass through AND gate 67 and are applied to the base of a transistor $Tr_{61}$ in the first switching circuit 62, the transistor $Tr_{61}$ is repetitively turned on and off so that the clock pulses $A_2$ (See also FIG. 7) with a pulse voltage $V_H$ higher than a zener voltage of a zener diode $D_{72}$ in the remote terminal equipment I are transmitted through the transmission lines $l_1$ and $l_2$ to the remote terminal equipment I. First a few clock pulses pass through a reverse-current blocking diode $D_7$ and charge the capacitor $C_0$, the voltage across which is used as a power voltage source. When the voltage across the capacitor $C_0$ rises to a predetermined level, the bit counter 72A and the digit counter 72B are energized. That is, the digit counter 72B delivers its output at one of the output terminals $a_0$–$a_5$ and thereafter whenever the digit counter 72B receives ten clock pulses $A_2$, the output is derived from the next higher digit output terminal. Thus the output appears sequentially at the output terminals $a_0$, $a_1$, $a_2$, $a_3$, $a_4$, $a_5$ and again at $a_0$ in the order named. It is assumed that the output be derived frist from the output terminal $a_0$. Then a transistor $Tr_{71}$ is enabled and consequently the switching transistor $Tr_0$ is enabled.

The remote terminal equipment I receives alternating clock pulses $V_H$ and $V_L$ as shown at $l_1$ in FIG. 7. When the remote terminal equipment I receives the clock pulse $V_L$ and then the transistor $Tr_0$ is enabled, the current flows through a zener diode $D_{61}$, a photodiode $D_{p1}$, a transistor $Tr_{62}$, a diode $D_{62}$, the transmission line $l_1$, a photodiode $D_{p2}$, the switching transistor $Tr_0$ and the transmission line $l_2$. As a result phototransistors $Tr_{p1}$ and $Tr_{p2}$ are enabled so that the clock pulses are delivered to the bit counter 72A. However the contents of the bit counter 72A will not be incremented because the bit counter 72A is so designed and constructed as to be responsive to the positive edge of the pulse. When the transistor $Tr_{p1}$ is enabled, the potential at the point C drops to a low level so that the pulse control circuit 66 is set and consequently the clock pulse $V_H$ is inhibited as described elsewhere (See FIG. 7,$A_2$). When the clock pulse $V_L$ disappears, no current will flow through the photodiodes $D_{p1}$ and $D_{p2}$ so that both the phototransistors $Tr_{p1}$ and $Tr_{p2}$ are disabled. In response to the rise of the collector voltage of the phototransistor $Tr_{p2}$, the contents in the bit counter 72A are incremented, and when the bit counter 72A has counted ten clock pulses $V_L$, the contents in the digit counter 72B are incremented by one (See FIG. 7, $l_1$ and $T_0$) so that a transistor $Tr_{72}$ corresponding to the $10^0$ digit position is selected. However, the reading of the meter M is shown as "4261" in FIGS. 6A and 6B so that no voltage is supplied from the bit counter 72A to the collector of the transistor $Tr_{72}$. That is, in response to the negative edge of the clock pulse $Q_9$ (See FIG. 7,$B_2$) the bit counter 72A is incremented and its output appears at the output terminal 0. Simultaneously the digit counter 72B is incremented by one so that the output appears at the output terminal a1 and consequently the transistor $Tr_{72}$ is selected but not enabled. As a result the switching transistor $Tr_0$ is disabled.

When the terminal equipment I receives the clock pulse $P_1$ (See FIG. 7,$A_2$), the switching transistor $Tr_0$ is disabled, but since the amplitude of the clock pulse $A_2$ is higher than that of the voltage source Vcc, the current flows through the photodiode $D_{p2}$ so that the photocoupler PC-2 is energized. Therefore the bit counter 72A is incremented by one in response to the negative edge of the clock pulse $P_1$ so that the bit output is derived from the bit output terminal 2 and applied to the transistor $Tr_{72}$. As a result the switching transistor $Tr_0$ is enabled.

Meanwhile, in order to monitor whether or not the switching transistor $Tr_0$ is enabled, the centralized data terminal II transmits the pulse train B, whose pulse voltage $V_L$ is lower than the source voltage Vcc, to the remote terminal equipment through the second switching circuit 63 when no clock pulse $A_2$ is transmitted. That is, switching transistor $Tr_0$ is enabled when the remote terminal equipment I receives the clock pulse $B_2$, and then the current flows through the transistor $Tr_{62}$, the transmission line $l_1$, the photodiode $D_{p2}$, the switching transistor $Tr_0$ and the transmission line $l_2$. As a result, the photodiode $D_{p1}$ emits light so that the phototransistor $Tr_{p1}$ is enabled and consequently the potential at the point C drops (See $R_1$ in FIG. 7,C). On the other hand when the switching transistor $Tr_0$ remains disabled, the phototransistor $Tr_{p1}$ also remains disabled so that the potential at the point C remains at a high level (See $R_0$ in FIG. 7,C). Thus in response to the level of the potential at the point C, whether the switching transistor $Tr_0$ is enabled or disabled may be detected.

When the remote terminal equipment I receives the pulse $Q_1$ with the pulse voltage $V_L$ from the second switching circuit 63 after the bit counter 72A has been incremented by one in response to the negative edge of the clock pulse $P_1$ as described above, the pulse $Q_1$ flows through the switching transistor $Tr_0$ which is now enabled. As a result the photodiode $D_{p1}$ emits the light which in turn enables the phototransistor $Tr_{p1}$ so that the potential at the point C drops as indicated at $R_1$ in FIG. 7,C. The pulse $Q_1$ flows through the photodiode $D_{p1}$ and the switching transistor $Tr_0$ so that the phototransistor $Tr_{p2}$ is enabled and consequently the potential at the point F drops as shown in FIG. 7,F. Simultaneously the photocoupler PC-1 is also energized so that the potential at the point C drops and consequently the pulse control circuit 66 is set. As a result the clock pulse $P_2$ is inhibited from being transmitted from the centralized data terminal II to the remote terminal equipment I.

When the pulse $Q_1$ disappears, the photocouplers PC-1 and PC-2 are turned off so that the potential at the point F in the remote terminal equipment I rises and consequently the bit counter 72A is incremented by one. The bit terminal 3 is not connected to the $10^0$ digit position terminal so that no collector voltage is supplied to the transistor $Tr_{72}$. The transistor $Tr_{72}$ is therefore disabled so that the switching transistor $Tr_8$ is disabled. The phototransistor $Tr_{p1}$ in the centralized data terminal II is also disabled.

In like manner, in response to the clock pulses $P_3$–$P_9$ the bit counter 72A is incremented, but the transistor $Tr_{72}$ remains disabled. That is, during the time interval $T_1$ allocated for the reading of a digit at the $10^0$ digit position, the potential at the point C drops only once. Therefore in response to the voltage drop at the point C the digit (1 in this example) at the $10^0$ digit position may be read.

In like manner, the digit at $10^1$ digit position may be read during the time interval $T_2$; the digit at the $10^2$ digit position, during the time interval $T_3$; and the digit (4 in this example) at the $10^3$ position, during the time interval $T_4$. Thus the data "4261" provided by the encoder M may be completely read and is displayed by the data display 65.

In summary, in the third embodiment the data in the remote terminal equipment I is read in response to the pulses inserted between the clock pulses transmitted from the centralized data terminal to the remote terminal equipment. As a result the data reading may not be adversely affected by the line resistance of the transmission lines so that the variations in level of the data signal transmitted from the remote terminal equipment I may be minimized and consequently the centralized data terminal II may easily detect the data transmitted from the remote terminal equipment I. In addition, the photodiode $D_{p2}$ is inserted in series with the load of the remote terminal equipment so that the delay in rise of the clock pulse in the remote terminal equipment due to the influences of the transmission lines may be substantially reduced and consequently the stable operation of the remote terminal equipment may be ensured. Furthermore only two transmission lines are required as with the case of the first or second embodiment so that the installation costs may be considerably reduced.

Figure 8:
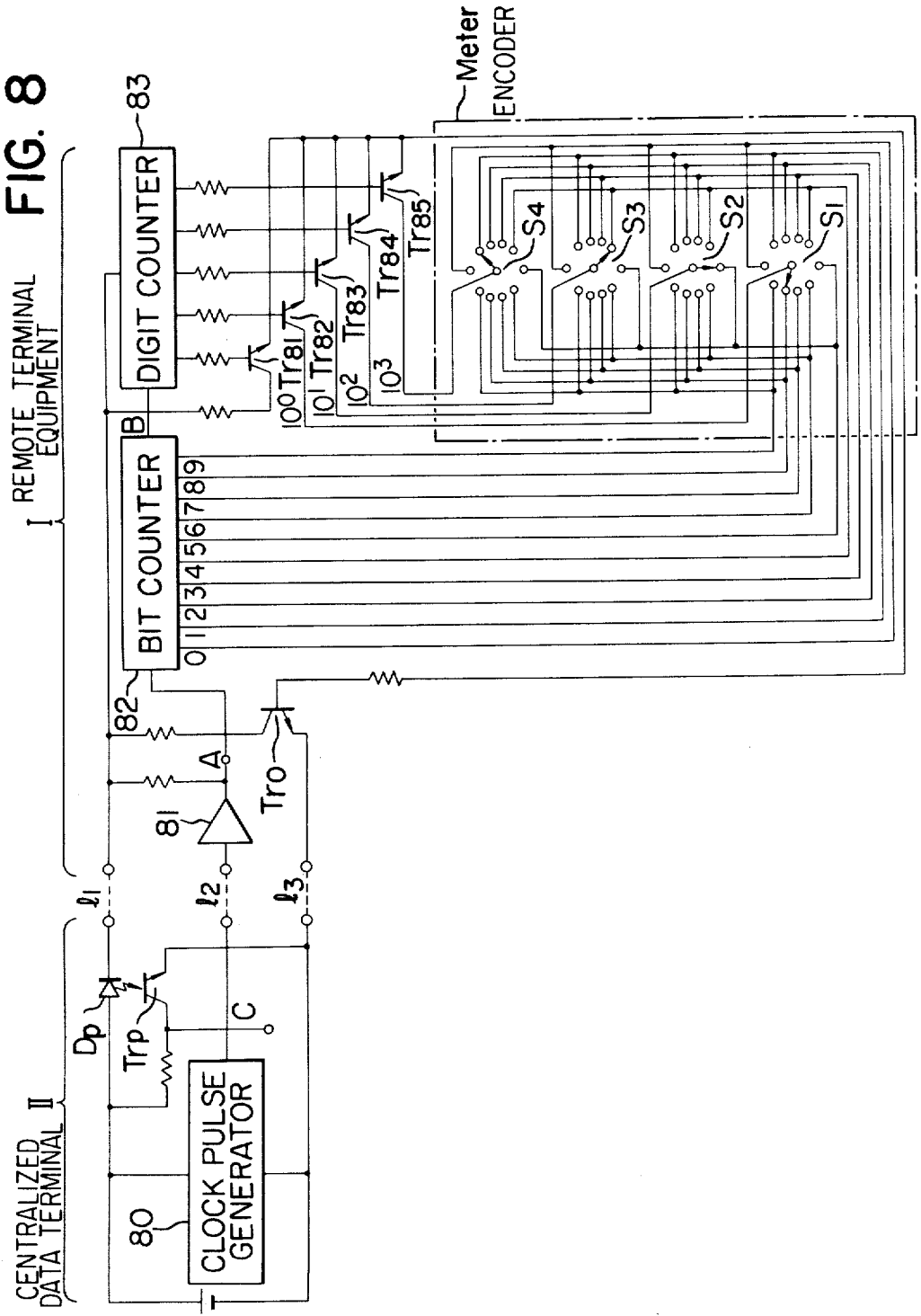
FIG. 8 is a block diagram of a fourth embodiment of the present invention.
Figure 9:
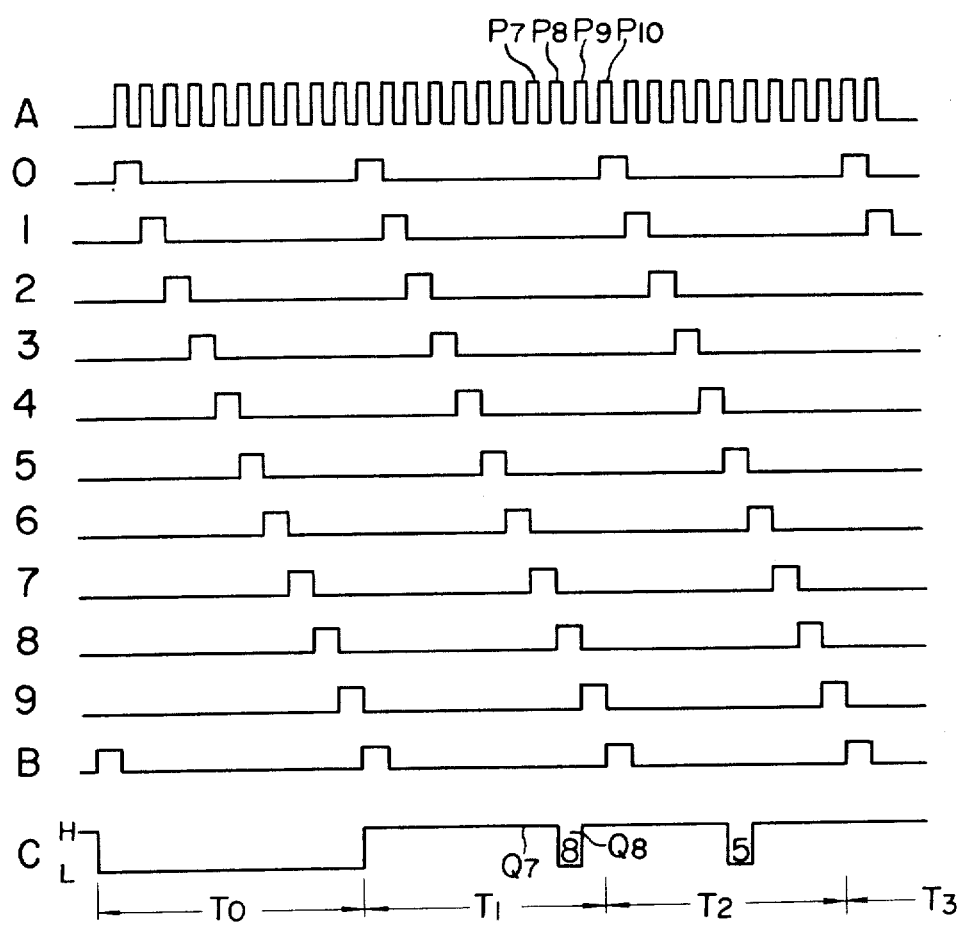
FIG. 9 shows the waveforms of various signals used for the explanation of the mode of operation of the fourth embodiment.

Fourth Embodiment, FIGS. 8 and 9

Referring to FIG. 8, a remote terminal equipment I is connected to the centralized data terminal II through three transmission lines $l_1$, $l_2$ and $l_3$; that is, the power and data signal transmission line, the clock pulse transmission line and the common transmission line.

The centralized data terminal II has a clock pulse generator 80. The remote terminal equipment I has a clock pulse receiver 81, a bit counter 82, a digit counter 83 and an encoder M.

The clock pulses generated by the clock generator 80 in the centralized data terminal II are transmitted through the transmission lines $l_2$ and $l_3$ to the remote terminal equipment I. The clock pulse receiver 81 in the remote terminal equipment I reshapes the received clock pulses and applies them to the bit counter 82 (See FIG. 9,A). The voltage outputs appear at the bit output terminals 0–9 of the bit counter 82 in synchronism with the clock pulses A as shown at 0–9 in FIG. 9.

When the remote terminal equipment I receives the power through the transmission lines $l_1$ and $l_3$ and the clock pulses through the transmission lines $l_2$ and $l_3$ as described above, the bit counter 82 and the digit counter 83 are set so that a transistor $Tr_{81}$ and the switching transistor $Tr_0$ are enabled. As a result the current flowing through a photodiode $D_p$ in the centralized data terminal II increases so that a phototransistor $Tr_p$ is enabled and consequently the potential at the point C drops. When the bit counter 82 receives ten clock pulses, the digit counter 83 is incremented by one (See the time interval $T_0$ in FIG. 9) so that a transistor $Tr_{82}$ corresponding to the $10^0$ digit position is selected. In this example the four-digit decimal number represented by the encoder or meter M is shown as "1458". Therefore the rotary arm of the first or $10^0$ digit position switch $S_1$ is not closing the 0 digit contact so that no voltage is supplied to the collector of the transistor $Tr_{82}$ from the bit counter 82 and consequently the transistor $Tr_{82}$ remains disabled. In response to the succeeding clock pulses up to $P_7$ the bit counter 82 is incremented one by one, but the transistor $Tr_{82}$ remains disabled and consequently the switching transistor $Tr_0$ also remains disabled. As a result almost no current will flow through the photodiode $D_p$ in the centralized data terminal II so that the phototransistor $Tr_p$ remains disabled and consequently the potential at the point C remains at a relatively high level as shown at $Q_7$ in FIG. 9.

In response to the clock pulse $P_8$, the bit counter 82 is incremented by one and its output appears at the 8 digit position output terminal which is connected through the first switch $S_1$ to the collector of the transistor $Tr_{82}$ so that the transistor $Tr_{82}$ is enabled and consequently the switching transistor $Tr_0$ is also enabled. Then the current flowing through the diode $D_p$ increases so that the phototransistor $Tr_p$ is enabled and consequently the potential at the point C drops to a low level as shown at $Q_8$ in FIG. 9.

In response to the next clock pulse $P_9$ the bit counter 82 is incremented by one so that it is no longer connected to the transistor $Tr_{82}$. Therefore the transistor $Tr_{82}$ is disabled and consequently the switching transistor $Tr_0$ is also disabled. As a result the potential at the point C rises again to a high level. Thus during the time interval $T_1$ allocated for reading a digit at the $10^0$ digit position, the potential at the point C drops to a low level only one time. Consequently, the indication at the $10^0$ digit position of the encoder M may be read, monitoring the timing when the potential at the point C drops to a low-level. In like manner the digit 5 at the $10^1$ digit position may be read during the time interval $T_2$; the digit 4 at the $10^2$ digit position, during the time interval $T_3$; and the digit 1 at the $10^3$ digit position, during the time interval $T_4$. Thus the indication by the encoder or meter M may be read.

As with the first, second and third embodiments of the present invention, the initially set conditions of the bit and digit counters 82 and 83 in response to the control signals transmitted from the centralized data terminal II are not predictable, but as the clock pulses A are continuously transmitted, the transistor $Tr_{81}$ is enabled so that the potential at the point C remains at a low level for a time interval equal to ten clock pulse spacings as shown at $T_0$ in FIG. 9. Therefore this low-level signal derived from the point C may be used as a sync pulse.

So far the present invention has been described as using the decimal number, but it will be understood that the present invention may be equally used with the binary-coded decimal code. However reverse-current-blocking diodes must be connected to respective bit output terminals of the bit counter 82 in order to prevent the shortcircuiting of the outputs.

In summary, according to the fourth embodiment of the present invention, the remote terminal equipment may be considerably simplified in circuit construction so that a number of components may be minimized, the fabrication costs may be remarkably reduced and the data collection system may become highly reliable and dependable in operation.

Figure 10:
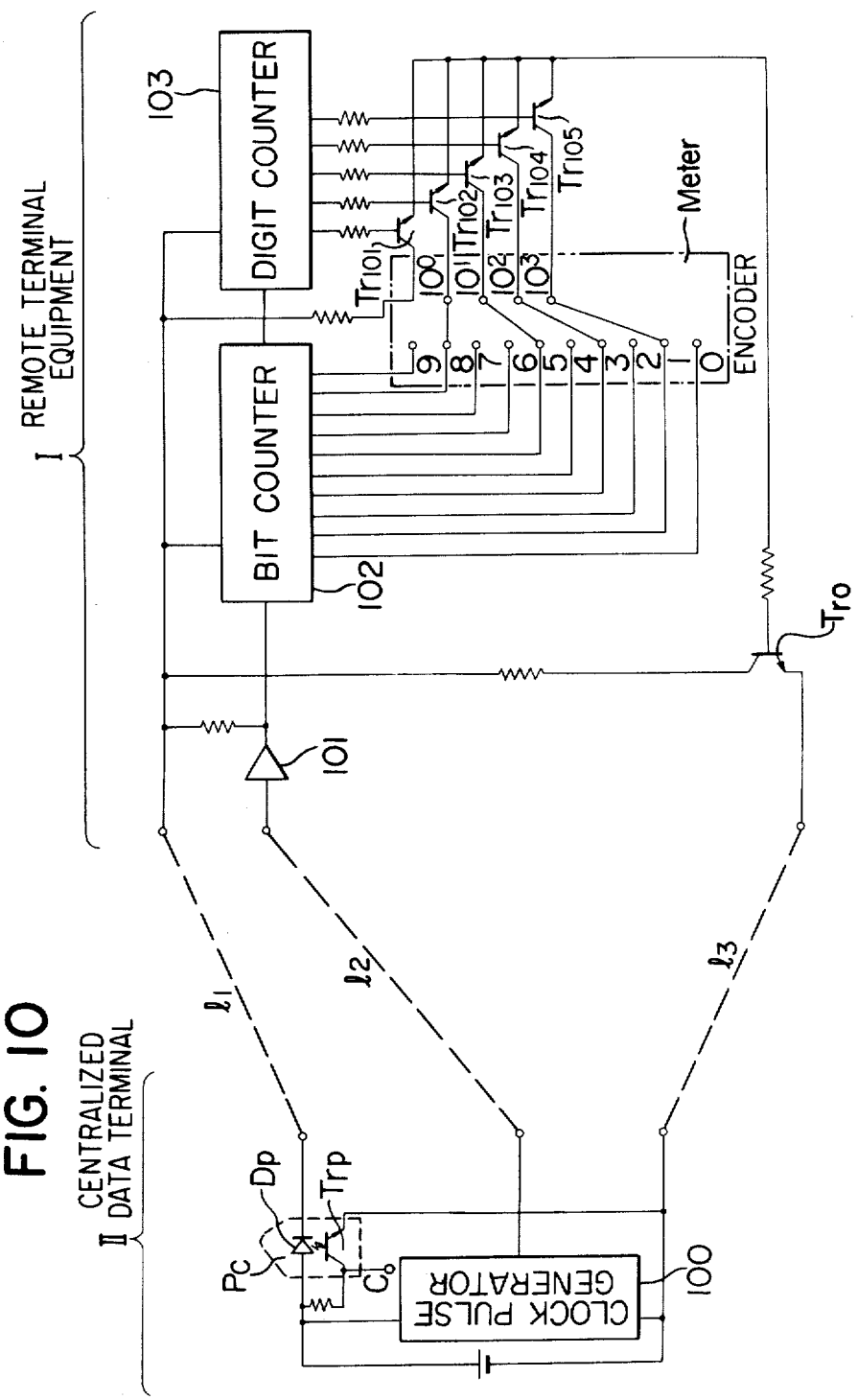
FIG. 10 is a block diagram of a fifth embodiment of the present invention.
Figure 11:
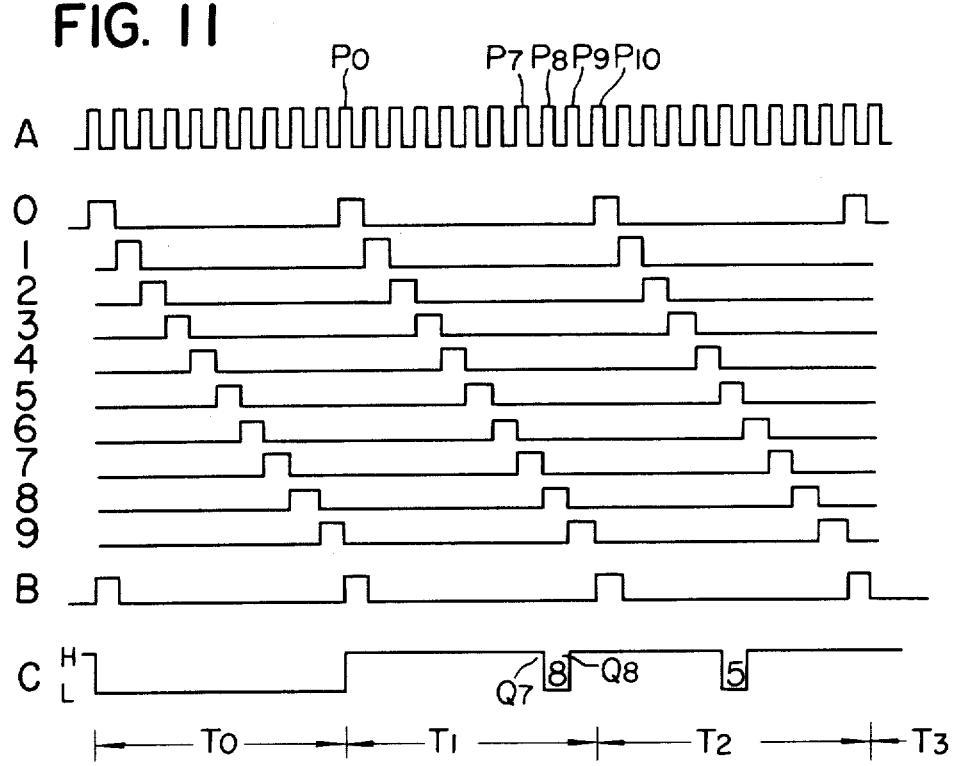
FIG. 11 shows the waveforms of various signals used for the explanation of the mode of operation of the fifth embodiment.
Figure 12:
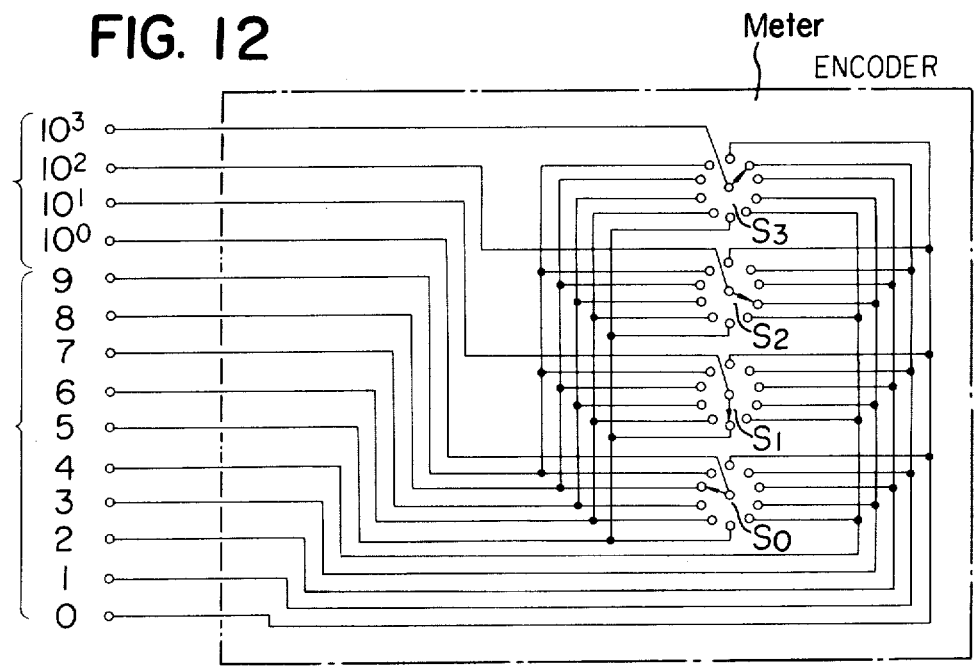
FIG. 12 is a detailed circuit diagram of an encoder of the fifth embodiment.

Fifth Embodiment, FIGS. 10–12

The remote terminal equipment I is connected to the centralized data terminal II through three transmission lines $l_1$, $l_2$ and $l_3$ as in the case of the fourth embodiment described above. The power and data signal are transmitted through the lines $l_1$ and $l_3$ while the clock pulses are transmitted through the lines $l_2$ and $l_3$.

The centralized data terminal II has a clock pulse generator 100 and a photocoupler consisting of a photodiode $D_p$ and a phototransistor $Tr_p$. The terminal equipment I includes a clock pulse receiver 101, a bit counter 102, a digit counter 103, an encoder or meter M and a switching transistor $Tr_0$.

The clock pulse receiver 101 reshapes the received clock pulses and applies them to the bit counter 102 (See FIG. 11,A). In response to the clock pulses A, the bit counter 102 delivers its output to the digit output terminals or contacts 0–9 in such timing as shown at 0–9 in FIG. 11.

In response to the power and clock pulses transmitted from the centralized data terminal II, both the bit and digit counters 102 and 103 are set and a transistor $Tr_{101}$ is enabled so that the switching transistor $Tr_0$ is also enabled. Then the current flowing through the photodiode $D_p$ in the centralized data terminal II increases so that the phototransistor $Tr_p$ is enabled and consequently the potential at the point C drops to a low level.

In response to the succeeding clock pulses, the bit counter 102 is incremented one by one. When it receives 10 clock pulses, the digit position counter 103 is incremented by one (See the time interval $T_0$ in FIG. 11) so that a transistor $Tr_{102}$ corresponding to the $10^0$ digit position is selected. In this example the encoder M represents "1358" so that the 0 digit output terminal or contact 0 of the bit counter 102 is not connected electrically to the $10^0$ digit position contact $10^0$ which in turn is connected to the collector of the transistor $Tr_{102}$. As a result no voltage is supplied to the collector of the transistor $Tr_{102}$ so that the latter is disabled and consequently the switching transistor $Tr_0$ is also disabled. Therefore the potential at the point C in the centralized data terminal II rises to a high level (See $Q_7$ in FIG. 11,C).

The above conditions remain unchanged until the remote terminal equipment I receives the pulse $P_7$ (See FIG. 11) which is the 18th pulse. In response to the clock pulse P, the bit counter 102 delivers its output to the 8 digit output terminal or contact 8 which is electrically connected to the $10^0$ digit position contact which in turn is connected to the collector of the transistor $Tr_{102}$. Therefore the transistor $Tr_{102}$ is now enabled and consequently the switching transistor $Tr_0$ is also enabled. As a result the current flowing through the photodiode $D_p$ increases so that the phototransistor $Tr_p$ is enabled and consequently the potential at the point C drops to a low level as shown at $Q_8$ in FIG. 11,C. In response to the next clock pulse $P_9$, the bit counter 102 delivers its output to the 9 digit output terminal or contact which is not connected to the $10^0$ digit position contact. Therefore the supply of the collector voltage to the transistor $Tr_{102}$ is inhibited so that the transistor $Tr_{102}$ is disabled and consequently the switching transistor $Tr_0$ is also disabled. The potential at the point C rises again to a high level. Thus the potential at the point C drops to a low level only once during the time interval $T_1$ allocated for reading a digit in the $10^0$ digit position. The reading of the digit 8 at the $10^0$ digit position may be made at the instant when the voltage at the point C drops to a low level.

In like manner, the digit 5 at the $10^1$ digit position may be read during the time interval $T_2$; the digit 3 at the $10^2$ digit position, during the time interval $T_3$; and the digit 1 at the $10^3$ digit position, during the time interval $T_4$. Thus the indication by the encoder or meter M may be read out.

As with the other embodiments of the present invention, the initially set conditions of the bit and digit counters 102 and 103 are not predictable, but as the clock pulses are continuously transmitted to the remote terminal equipment I from the centralized data terminal II, the transistor $Tr_{101}$ is enabled so that the potential at the point C drops to a low level for a time interval equal to 10 clock pulse spacings as indicated at $T_0$ in FIG. 11,C. This low-level voltage signal may be used as a sync signal for starting the reading.

The encoder M is shown in detail in FIG. 12. It has terminals 0–9 which in turn are connected to the digit output terminals (See FIG. 10) of the bit counter 102 and terminals $10^0$–$10^3$ which are connected to the collectors, respectively, of the transistors $Tr_{102}$–$Tr_{105}$. The pulse signals or outputs from the bit counter 102 which are synchronized with the clock pulses shown at A in FIG. 11 sequentially appear at the terminals 0–9 at the timing shown at 0–9 in FIG. 11 as described elsewhere. The digits at the $10^0$, $10^1$, $10^2$ and $10^3$ digit positions are selected by switches $S_0$, $S_1$, $S_2$ and $S_3$, respectively. Therefore the switches of the encoder close the fixed contacts depending upon the present reading of a gas, water or watt-hour meter.

In summary, in the fifth embodiment, the clock pulses are transmitted independently of the power and data signals so that the clock pulses may be stabilized. In consequence the terminal equipment may be simplified in circuit construction so that the number of components may be minimized, the fabrication costs may be remarkably reduced and the data collection system may be highly reliable and dependable in operation.

What is claimed is:

1. In a data collection system having a central data terminal and a plurality of remote terminal units connected to said data terminal through transmission lines so that data in selected ones of said remote terminal units may be read out at said central data terminal by pulses transmitted from said central data terminal to said selected remote terminal units through said transmission lines, the improvement wherein:

said central data terminal comprises clock pulse generator means for providing a train of pulses to be transmitted to said selected remote terminal units through said transmission lines, and means for detecting changes in the amplitude of said pulses which cause the read out of said data; and each of said remote terminal units comprises:
a chargeable power supply which reaches a voltage over a predetermined threshold value by storing said pulses transmitted from said centralized data terminal through said transmission lines
a bit counter and a digit counter operatively connected with each other and having their outputs coupled to a plurality of AND-gate circuits, said counters being enabled when the voltage of said power supply has reached said predetermined threshold value,
an encoder means coupled to the outputs of said bit counter and said digit counter through said AND-gate circuits for storing data to be read out, and
means to change the level of said pulses when any one of said AND-gate circuits has an output of a given value,
whereby, said bit counter counts said pulses from said centralized data terminal and provides corresponding outputs to said encoder means, said encoder means generating output pulses when the inputs to said encoder means from said bit counter coincide with a desired value of each digit of said data to be read out, and the levels of said encoder output pulses are varied by said level change means so that said output pulses contain the data to be transmitted to said central data terminal.

2. A data collection system as set forth in claim 1, further comprising a photocoupler for shifting said bit counter with said pulses from said central data terminal.

3. A data collection system as set forth in claim 1, wherein said pulse train transmitted through said transmission lines comprises a series of positive and negative pulses with which said data is read out, and the level of said positive pulses is changed when said data is read out.

4. A remote meter reading system having a central terminal and at least one remote terminal including a meter, said terminals being interconnected through transmission lines, said central terminal having:
a source of clock pulses;
means for transmitting a train of said pulses to said remote terminal; and
means for counting the number of pulses of said train having a level on one side of predetermined threshold level;

said remote terminal having;
a capacitor adapted to be charged by said train of pulses to a voltage level sufficient to enable said capacitor to supply power for the operation of said remote terminal;
a multistage bit counter powered by said capacitor and stepped by said train of pulses;
a multistage digit counter powered by said capacitor and stepped by said train of pulses;

encoding means coupled to said meter and interconnecting the outputs of said multistage counters for changing the level of corresponding ones of said pulses of said train by changing the current drawn from said central terminal whenever there is coincidence between the bit counter and digit counter outputs so as to actuate said counting means of said central terminal accordingly; whereby the number of pulses counted by said counting means corresponds to the desired meter reading.

5. The remote meter reading system according to claim 4, wherein said counting means of said central terminal includes a counter which is stepped by the clock pulses and disabled by the relatively large amplitude pulses developed when the bit and digit counter outputs of the remote terminal coincide.

* * * * *